(12) United States Patent
Sagarsee et al.

(10) Patent No.: US 8,461,466 B2
(45) Date of Patent: Jun. 11, 2013

(54) TRUCK SCALE WITH REMOVABLE DECK

(75) Inventors: Samuel R. Sagarsee, Terre Haute, IN (US); Walter M. Young, Waldwick, NJ (US)

(73) Assignee: Emery Winslow Scale Company, Seymour, CT (US)

( * ) Notice: Subject to any disclaimer, the term of this patent is extended or adjusted under 35 U.S.C. 154(b) by 436 days.

(21) Appl. No.: 12/723,989

(22) Filed: Mar. 15, 2010

(65) Prior Publication Data

US 2011/0220424 A1    Sep. 15, 2011

(51) Int. Cl.
*G01G 21/00* (2006.01)
*G01G 19/02* (2006.01)

(52) U.S. Cl.
USPC ............ 177/126; 177/132; 177/133; 177/134

(58) Field of Classification Search
USPC .................................. 177/132–135, 128, 129
See application file for complete search history.

(56) References Cited

U.S. PATENT DOCUMENTS

| | | | | |
|---|---|---|---|---|
| 3,711,122 A | * | 1/1973 | Holmberg et al. | 280/421 |
| 3,966,001 A | * | 6/1976 | Goldberg | 177/128 |
| 3,997,014 A | * | 12/1976 | Soderholm et al. | 177/128 |
| 4,258,814 A | | 3/1981 | Dillon | |
| 4,554,987 A | | 11/1985 | Dillon | |
| 4,733,736 A | | 3/1988 | Holtgreven et al. | |
| 4,803,940 A | * | 2/1989 | Ebeling et al. | 114/72 |
| 4,995,664 A | * | 2/1991 | Buday | 296/165 |
| 5,308,933 A | | 5/1994 | Ahl | |
| 5,446,248 A | * | 8/1995 | Strasser | 177/134 |
| 6,706,976 B1 | | 3/2004 | Schuler | |
| 7,094,976 B2 | * | 8/2006 | Kim | 177/132 |
| 7,504,594 B1 | * | 3/2009 | Ruth et al. | 177/128 |
| 2011/0232974 A1 | * | 9/2011 | Abercrombie et al. | 177/133 |

* cited by examiner

*Primary Examiner* — Randy W Gibson
(74) *Attorney, Agent, or Firm* — St. Onge Steward Johnston & Reens LLC (57) ABSTRACT

A scale for weighing a vehicle which includes a removable platform supported by a plurality of load cells, the removable platform having a plurality of centering fixtures with each centering fixture having a cavity in its bottom section with a perimeter. The scale further including a plurality of centering projections having an outer surface which the perimeter of the cavity of the plurality of centering fixtures is guided upon lowering the removable platform onto the plurality of load cells.

25 Claims, 8 Drawing Sheets

TRUCK SCALE WITH REMOVABLE DECK

FIELD OF THE INVENTION

The present invention relates generally to truck scales. More particularly, the present invention relates to an improved truck scale having a platform that can be easily removed and repositioned without the need to be realigned or recalibrated.

BACKGROUND OF THE INVENTION

A basic truck scale configuration uses four load cells and a single platform, which is generally 25' long×12' wide. However, the platform size and number of load cells used can vary widely depending on the application. For example, two or more basic scales can be set end to end or side by side to build a longer or wider scale, a section of foundation could be built between the two scales, or a spacer platform could be hung between two scales. Furthermore, truck scales can be installed in a variety of different ways such as above ground, inside a deep pit, inside a shallow pit, or in some combination such as a three-sided pit.

Designing a scale for the weighing of heavy vehicles, such as cargo carrying trucks, presents a number of unique problems. For example, a conventional truck scale is normally an outdoor installation which is exposed not only to the elements, but also to chemicals, such as road salts, oil, transmission fluid, brake fluid, antifreeze, diesel, gasoline, and so on. Some scales are even subject to more extreme elements such as garbage, coal, and aggregate. For instance, scales used in garbage dumps are often subject to over filled trucks, which spill their contents onto the platform of the scale. The spilled garbage then finds its way into the pit below the platform along with other fluids leaked from the truck. This necessitates not only the scale being robust in order to withstand these elements, but also the removal of the platform for cleaning and/or servicing.

Another unique scale design problem is that once a scale is installed it must be calibrated in order to provide accurate readings. A calibrated scale must precisely maintain its configuration as established at the time of calibration in order to provide accurate and repeatable measurements. This calibration can be lost if even one of the load cells is shifted out of position by more than a minute amount. This generally means that a scale must be realigned and recalibrated each time the platform is removed, which is a time consuming and costly activity.

In order to avoid the need for realignment and recalibration, the platform must be placed precisely where it was at the time it was initially calibrated.

What is desired, therefore, is a truck scale with a removable platform that does not require to be realigned and recalibrated each time the platform is removed.

SUMMARY OF THE INVENTION

Accordingly, it is an object of the present invention to provide a truck scale with a removable platform that includes an alignment mechanism, which eliminates the need to realign and recalibrate the scale after returning the platform into position.

Another object of the present invention is to provide a truck scale having the above characteristics and which has a simplified design, so as not to be overly expensive to produce or prone to failure.

A further object of the present invention is to provide a truck scale having the above characteristics and that is simple to operate.

These and other objects of the invention are achieved by providing a removable platform, a plurality of centering fixtures on said removable platform, each said centering fixture having a bottom section with a cavity having a perimeter; a plurality of load cells to support said removable platform; a plurality of centering projections having an outer surface, said plurality of centering projections being removable; wherein the perimeter of the cavity of said plurality of centering fixtures is guided over the outer surface of said plurality of centering projections; and wherein upon lowering said removable platform onto said plurality of load cells, said centering projections are removed.

In some embodiments, the centering projections have a top section which is one of domed, conical, frusto conical, triangular, and rounded.

In some embodiments, the cavity of said plurality of centering fixtures has an opening which is one of chamfered, flared, angled, and rounded.

In some embodiments, the outer perimeter of at least one of said plurality of centering projections is larger than the outer perimeter of the rest of said plurality of centering projections.

Other objects of the present invention are achieved by providing a removable platform, a plurality of centering fixtures on said removable platform, each said centering fixture having a bottom section with a cavity having a perimeter, a plurality of load cells to support said removable platform, a plurality of centering projections having an outer surface, and wherein the perimeter of the cavity of said plurality of centering fixtures is guided over the outer surface of said plurality of centering projections upon lowering said removable platform onto said plurality of load cells.

In further embodiments, other objects of the present invention are achieved by providing a removable platform, said removable platform having a raised and a lowered position; a plurality of load cells to support said removable platform in the lowered position; a plurality of centering projections, said centering projections being removable when said removable platform is in the lowered position; a plurality of centering fixtures on said removable platform; and wherein upon moving said removable platform from the raised position to the lowered position, said plurality of centering projections are inserted into said plurality of centering fixtures, guiding the removable platform onto said plurality of load cells.

Other objects of the invention and its particular features and advantages will become more apparent from consideration of the following drawings and accompanying detailed description.

DETAILED DESCRIPTION OF THE INVENTION

Figure 1:
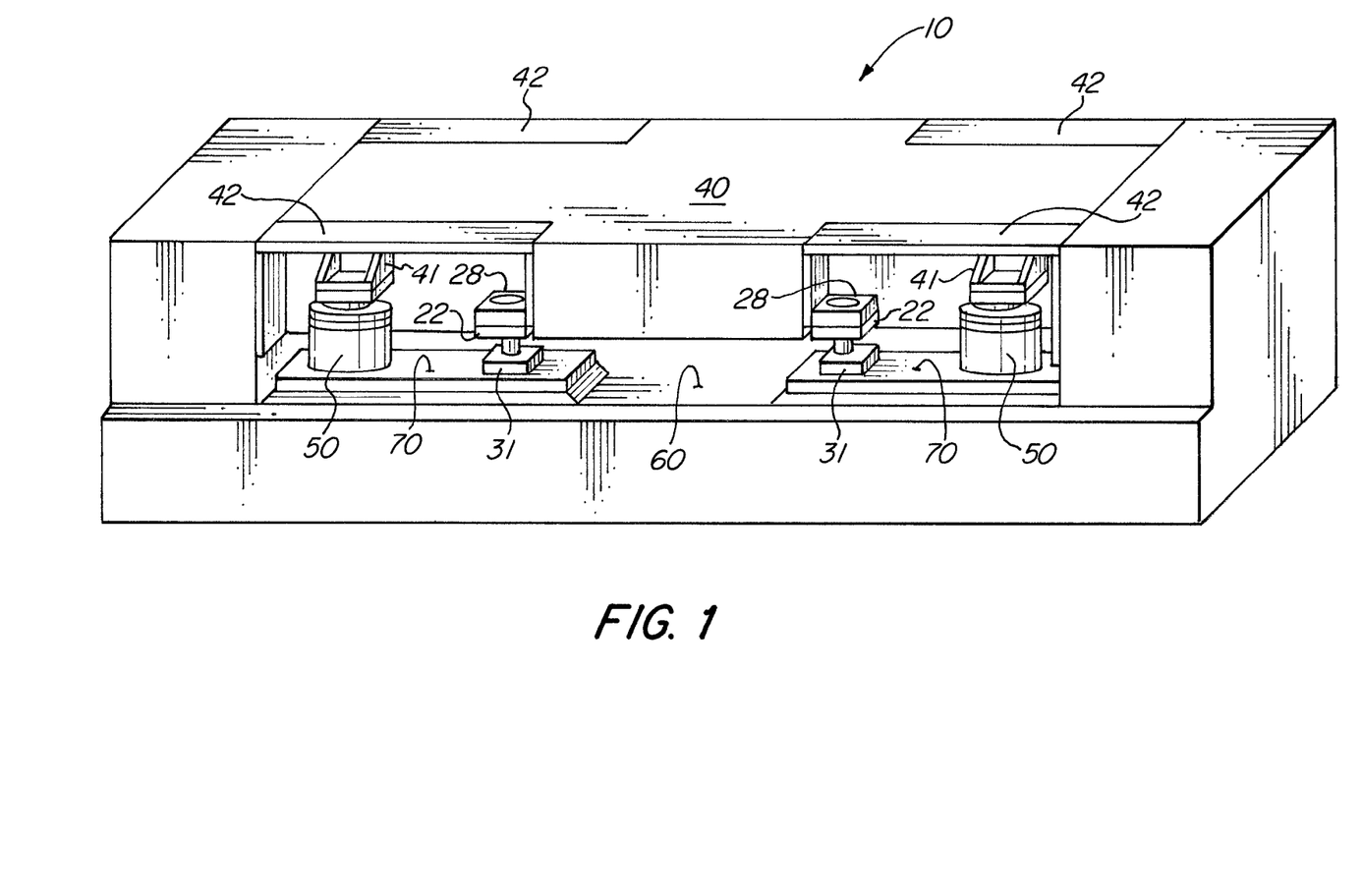
FIG. 1 is a partial cutaway isometric view of the scale in accordance with an exemplary embodiment of the present invention.
Figure 2:
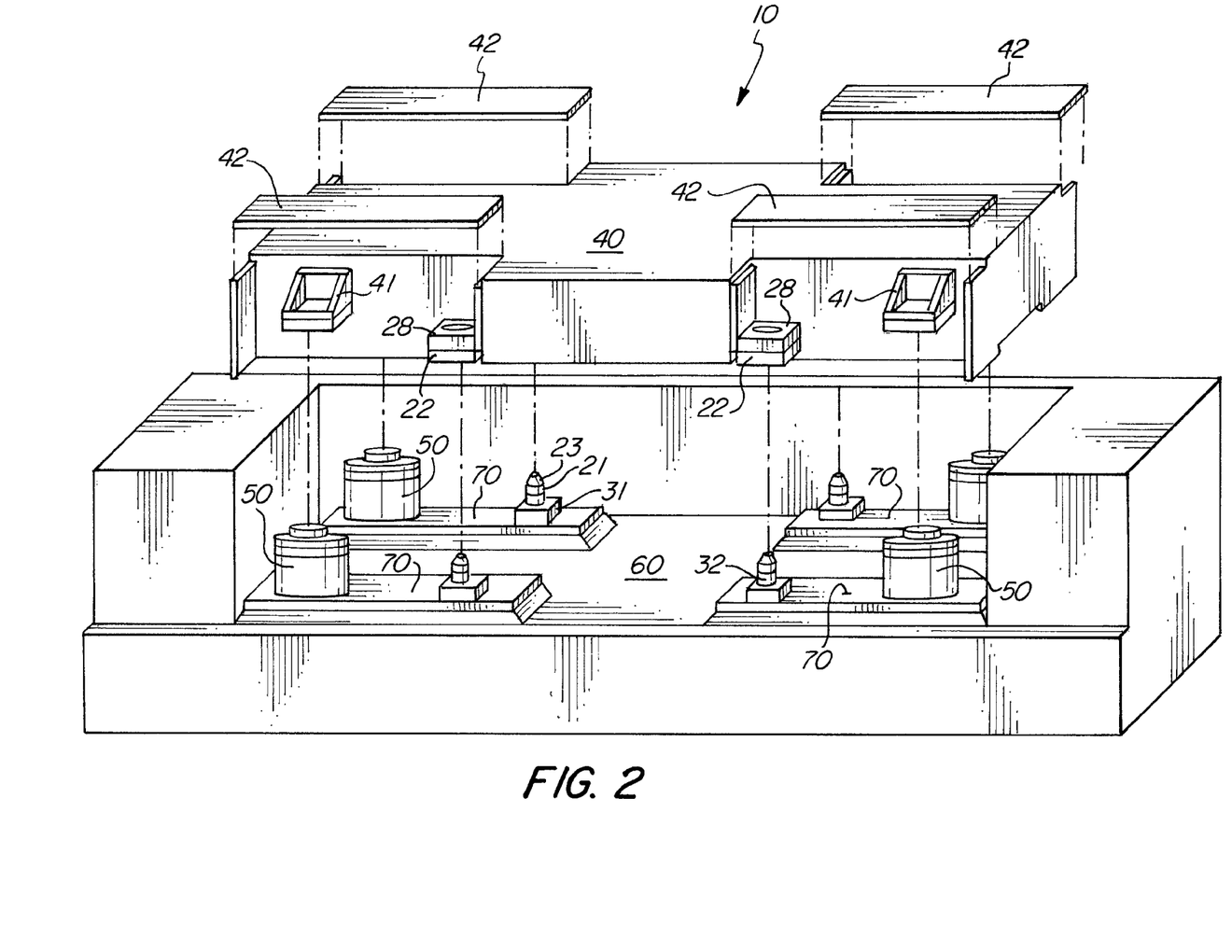
FIG. 2 is and exploded isometric view of the scale shown in FIG. 1.

FIGS. 1 and 2 show a truck scale 10 with alignment mechanisms 20 according to the preferred embodiment of the present invention. The alignment mechanisms 20 are comprised of a plurality of centering projections 21 with corresponding centering fixtures 22, which are used to precisely guide the platform 40 back to its original position at the time the scale 10 was calibrated. The platform 40 also has support brackets 41 resting on top of load cells 50 for supporting the platform 40 above a foundation 60. In the preferred embodiment a centering projection 21 is placed next to each load cell 50.

It is beneficial to have access to both the load cells 50 and alignment mechanisms 20. Access can be through the top of the platform 40 via an access panel 42 or from the side of the platform 40 (not shown). If access is from the side, and the scale 10 is mounted in a pit, then access pockets must be made into the sides of the pit near where the load cells 50 are located (typically at the four corners). The alignment mechanisms 20 can either be attached under scale's platform 40 (internally) as shown or to the side of the platform 40 (externally), but should be accessible by some means such as those described above.

In the preferred embodiment, each load cell 50 and its corresponding centering projection 21 are fixed to a common base plate 70 on the foundation 50. The advantage of having each load cell 50 and centering projection 21 paired with a common base plate 70 is it allows for easy installation since the fixed relationships are essential for the platform 40 to be precisely relocated.

Figure 3:
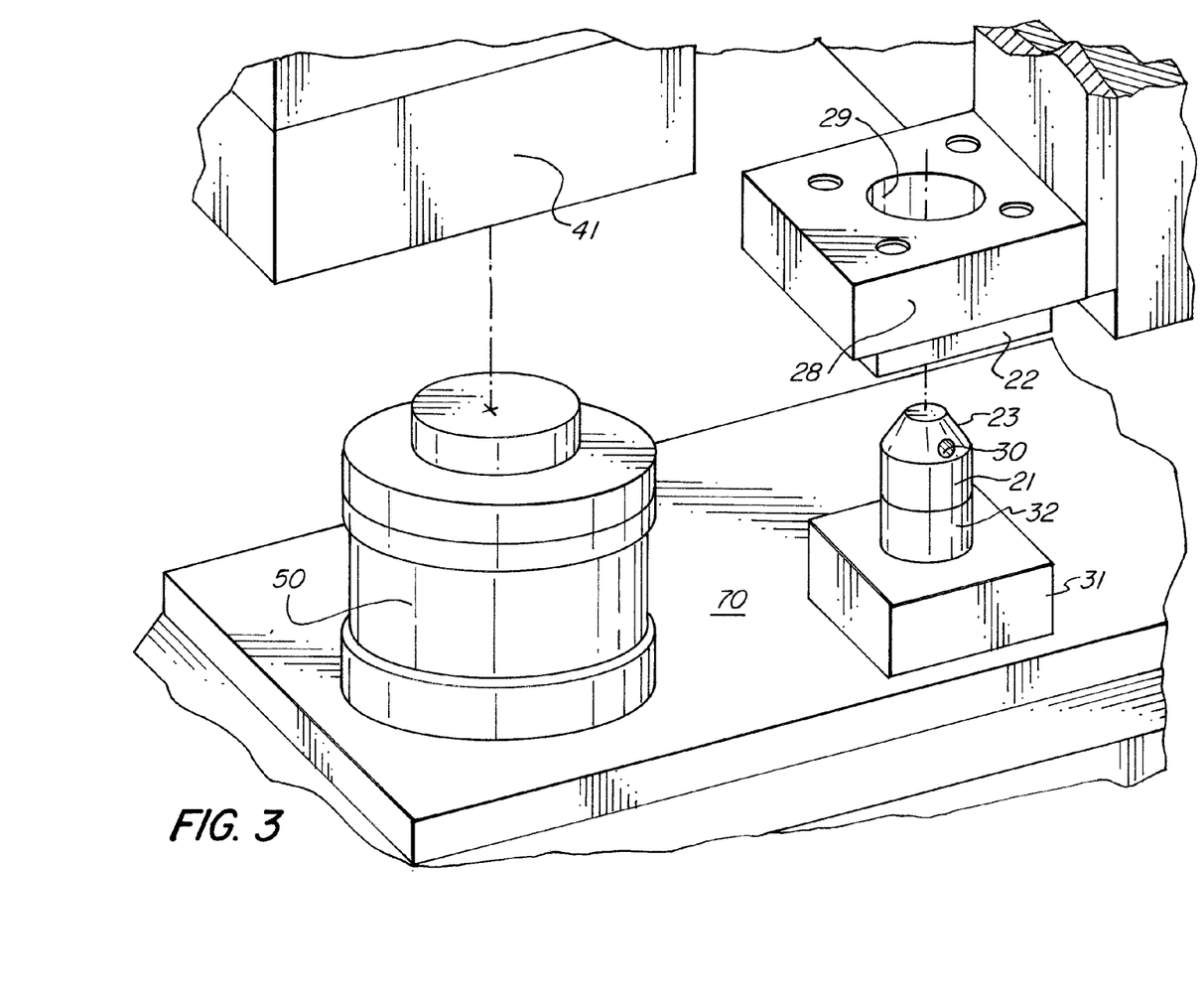
FIG. 3 is an isometric view of the alignment mechanism in FIG. 1.
Figure 4:
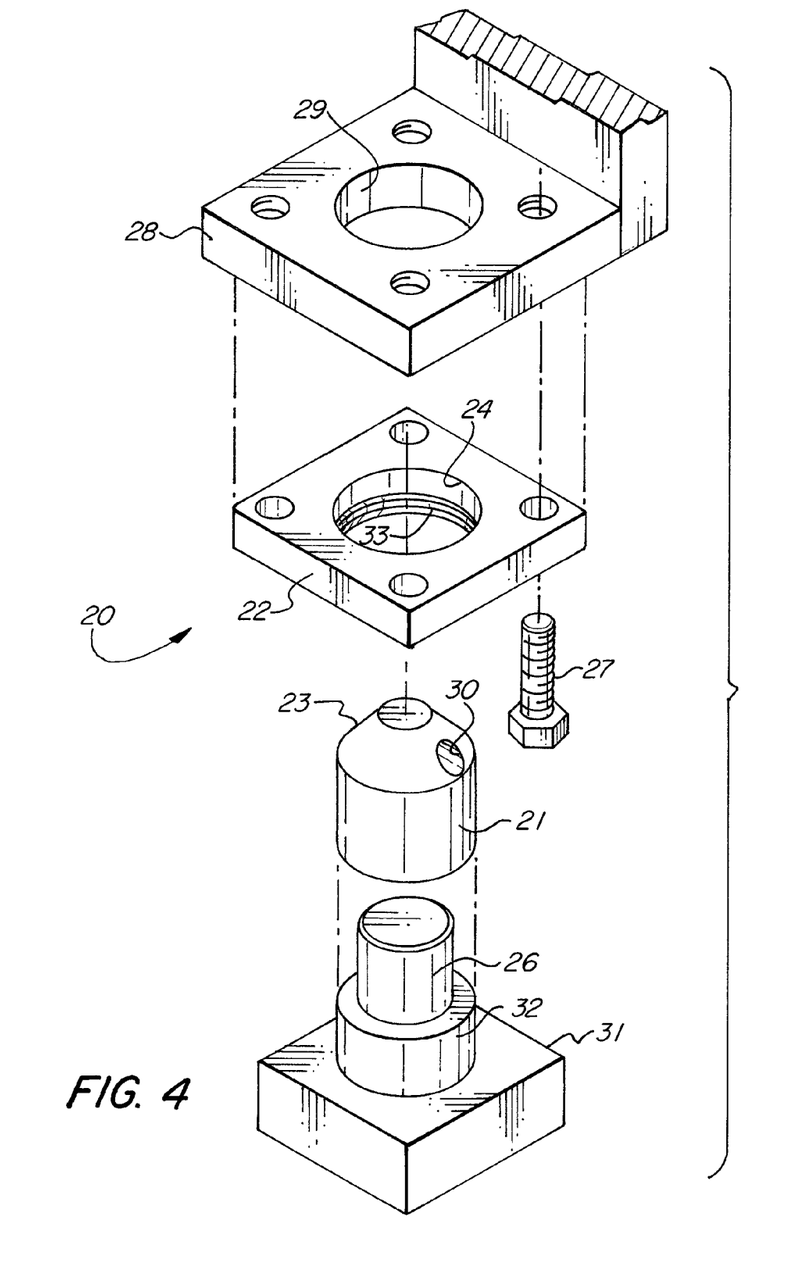
FIG. 4 is an isometric exploded view of the alignment mechanism in FIG. 1.
Figure 5:
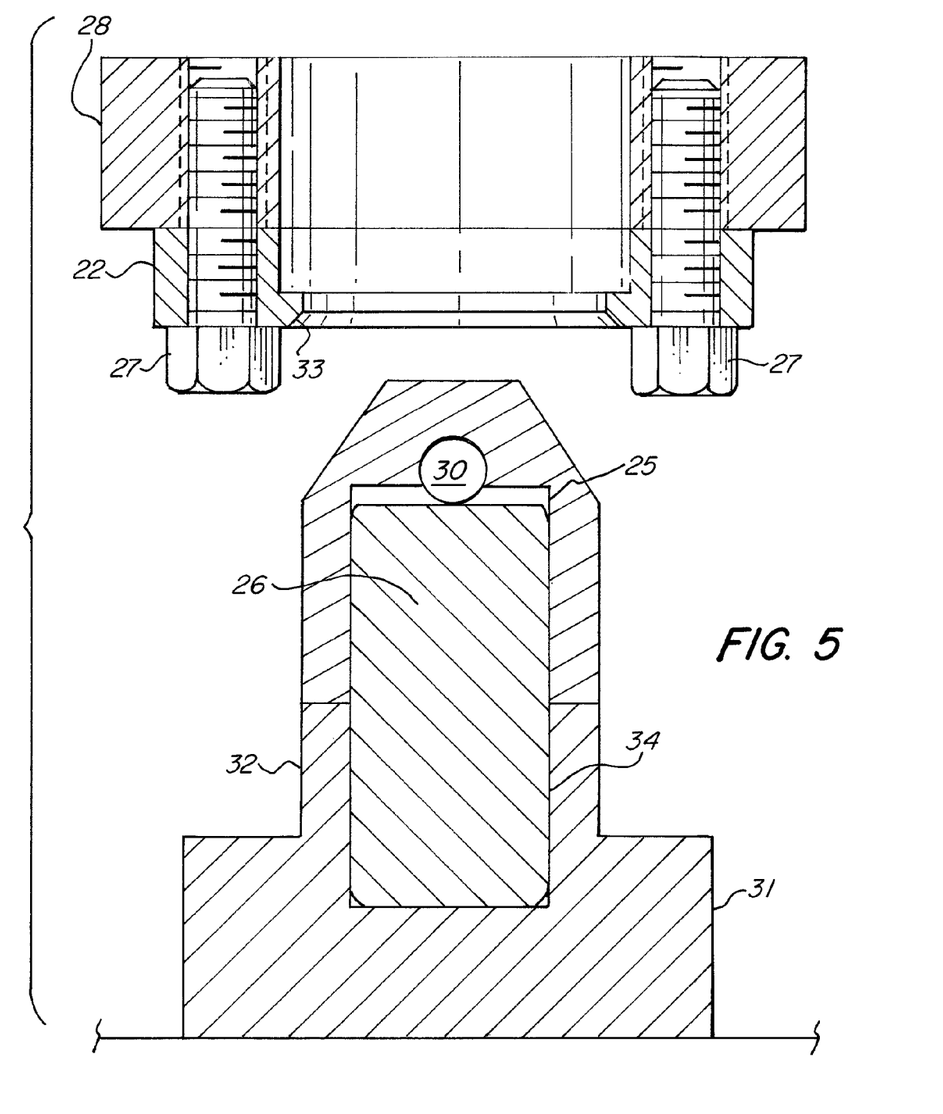
FIG. 5 is a cross-sectional view of the alignment mechanism in FIG. 1.

FIGS. 3-5 show several views of the preferred embodiment of the alignment mechanism 20. The alignment mechanism 20 includes a centering projection 21 with a frusto conical top 23, and a centering fixture 22 with a circular hole therethrough. The frusto conical top 23 of the centering projection 21 forces alignment with the hole in the centering fixture 22 as the platform 40 is lowered. When fully aligned, the center of the circular hole in the centering fixture 22 is substantially coincident with the longitudinal axis of the centering projection 21, such that the pair provides for precise relocation. The clearance between the centering projection 21 and the centering fixture 22 is determined by the level of precise placement required. Typically this clearance is $1/64^{th}$ of an inch or less however, larger clearances can be used depending on the application and precision needed.

Figure 11:
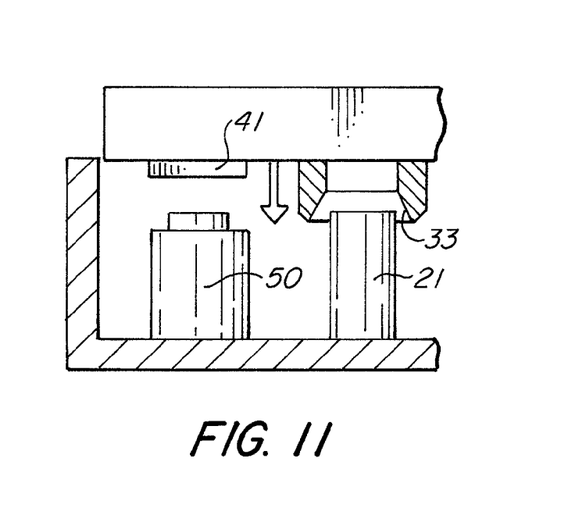
FIG. 11 is a side view of another embodiment of the alignment mechanism.

Another aspect of the alignment mechanism 20 is the angle of top 23 of the centering projection 21 and the angle of the tapered portion 33 hole 24 of the centering fixture 22. In the preferred embodiment shown, both portions are angled at approximately 45 degrees to allow for easy alignment. However, it is possible to only angle either the centering projection 21 or the centering fixture 22, as shown in FIG. 11. Furthermore, although both the centering projections 21 and centering fixtures 22 have been shown as having a round cross-section and the centering fixture 22 has only been shown to have a frusto conical shape, other shapes and cross sections can be used. For instance, the centering projections 21 need not be blunt but may also be pointed and any regular polygon with a suitably shaped projection 21 may be used, an example of which would be a square cross section with a pyramid projection. Also, it can be advantageous to have one or more centering projections 21 to be a different size or shape so as to prevent the platform 40 from being placed back in a different orientation.

Still another aspect of the preferred embodiment is that the centering projections 21 are removable once the platform 40 is positioned on the load cells 50. The removal of the centering projections 21 prevents the centering fixtures 22 from interfering with the scales performance when the clearance between the centering projections 21 and the centering fixtures 22 is tight. The removable centering projection 21 contains a hole 25 in its bottom that slides down over a dowel pin 26. In addition, as can be seen in FIGS. 4 and 5, the centering fixtures 22 are attached with bolts 27 to a bracket 28 fixed to the platform 40. This configuration allows the centering fixtures 22 to be easily replaced if one is damaged. The bracket 28 that the centering fixture 22 is attached also contains a through hole 29, which allows the removable centering projection 21 to be pulled off the dowel pin 26. However, it is also possible to have the centering fixture 22 made in one piece with the bracket or the platform 40 itself.

Each centering projection 21 also has a horizontal bore 30 that serves as a finger grip for use when removing the centering projection 21. The bore 30 also vents air so that the centering projection 21 can slide down over the dowel pin 26 easily. One could also thread a strong wire through the bore 30 for more leverage if the centering projection 21 were to get jammed on the dowel pin 26. Further embodiments of the centering projection 21 can utilize other ways to help grip the centering projection 21 such as indentations or a channel along the perimeter of the centering projection 21.

Since space is usually limited around the load cell 50, the dowel pin 26 can also be removable in order to facilitate installation and maintenance. One way to make the dowel pin 26 removable is shown in FIG. 5. As can be seen, the dowel pin 26 is sitting in a base block 31 that is fixed to the base plate 70. The hole 34 in the base block 31 is such that the dowel fits securely in the base block 31. To further clear space, it is also possible to make the base block 31 holding the dowel detachable from the base plate 70. This can be helpful if the load cell 50 needed servicing when the platform 40 is in place or removed. If the base block 31 were removed when the platform 40 was in place, the base block 31 would need to be slid underneath the centering fixture 22 and the dowel pin 26 dropped into place through the hole in the centering fixture 22. The clearance between the hole in the removable centering projection 21 and dowel pin 26 is a slip fit. Ideally the slip fit is tight enough to maintain the precision of the location, but also loose enough to allow for the centering projection 21 to be easily removed.

The base block 31 shown in FIG. 5 consists of a square base with a round boss 32 on top. This shape provides a step which helps prevent debris from building up where the centering fixture 22 rests during operation of the scale 10. Such buildup could negatively affect performance of the scale 10 or prevent the centering projection 21 from sitting properly. Although the base block 31 has been shown with a square base and a round boss 32 other shapes are also suitable. Furthermore, the base block 31 and the round boss 32 can either be separate pieces connected together or be formed in one piece.

The removable centering projection 21, dowel pin 26 and centering fixture 22 are ideally made of hard, corrosion resistant material such as 17-4PH stainless steel. Such a material is good at preventing wear and rust, which would negatively affect the alignment capability; therefore a grade of hardened stainless steel or other durable and corrosion resistant material are ideal in order to ensure long life and good performance.

FIGS. 6-10 show an alignment mechanism 20 near one of the load cells 50 in various states of operation while the platform 40 is being lowered into place. In the preferred embodiment each load cell 50 has its own corresponding centering projection 21. FIGS. 6-10 are representative of what happens at each load cell 50 located in the corners of the scale 10 shown in FIG. 1.

Figure 6:
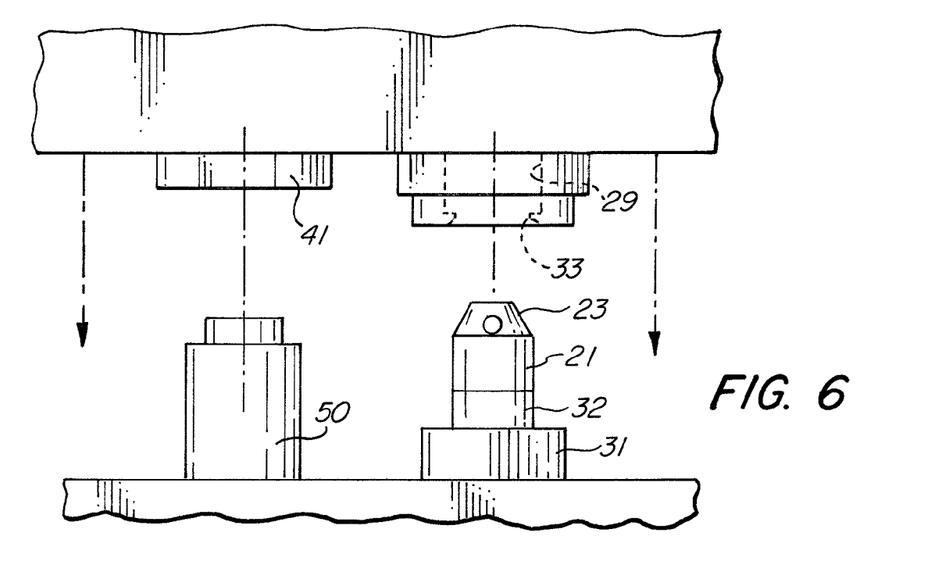
FIG. 6 is a side view of the alignment mechanism in FIG. 1 with the platform removed.

FIG. 6 shows the platform 40 in a raised position ready to be lowered back into place with the removable centering projection 21 in position. It should be noted that while lowering the platform 40 into place care should be taken to ensure that the platform 40 is maintained reasonably level and that the centering projection 21 can be seen through the centering fixture 22. The centering projection 21 does not need to be perfectly centered in the hole, just visible, since the frusto conical top 23 of the centering projection 21 will guide the platform 40 into position.

Figure 7:
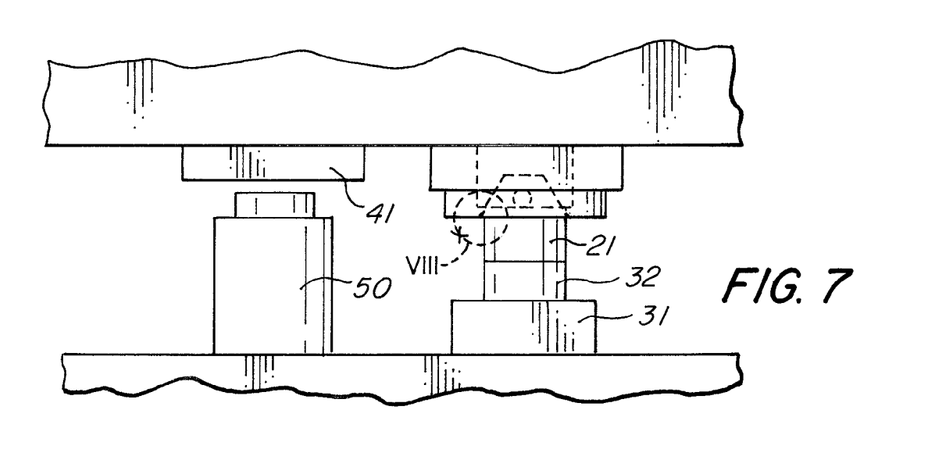
FIG. 7. is a side view of the alignment mechanism in FIG. 1 with the platform being positioned.
Figure 8:
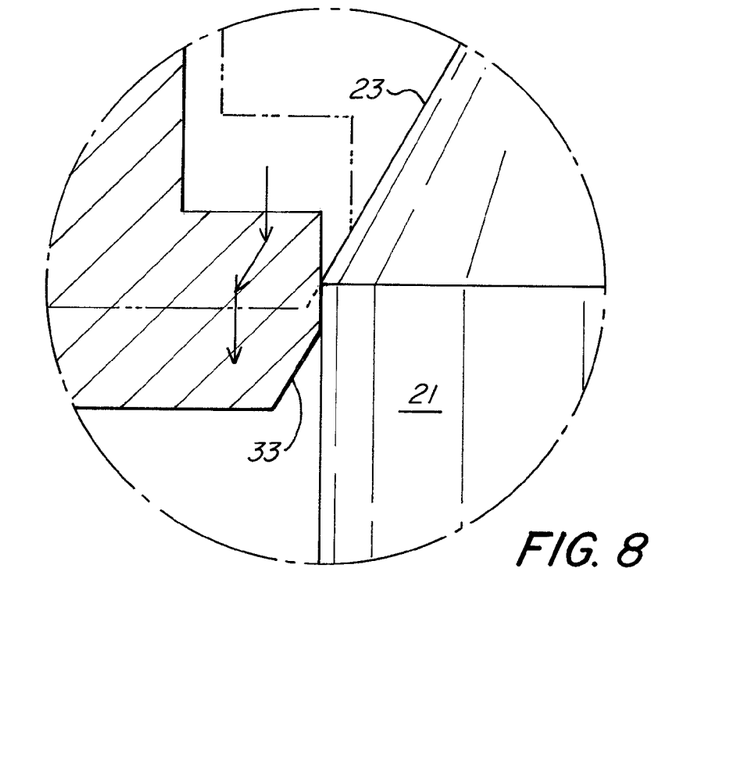
FIG. 8 is a magnified view of the alignment mechanism in FIG. 7.

FIG. 7 shows the centering fixture 22 in contact with the centering projection's 21 frusto conical top 23. In this position, as the platform 40 is lowered the centering fixture 22 is slid down over the centering fixture 22 aligning the platform 40 into position on top of the load cell 50. FIG. 8 shows a close-up view of the alignment taking place.

Figure 9:
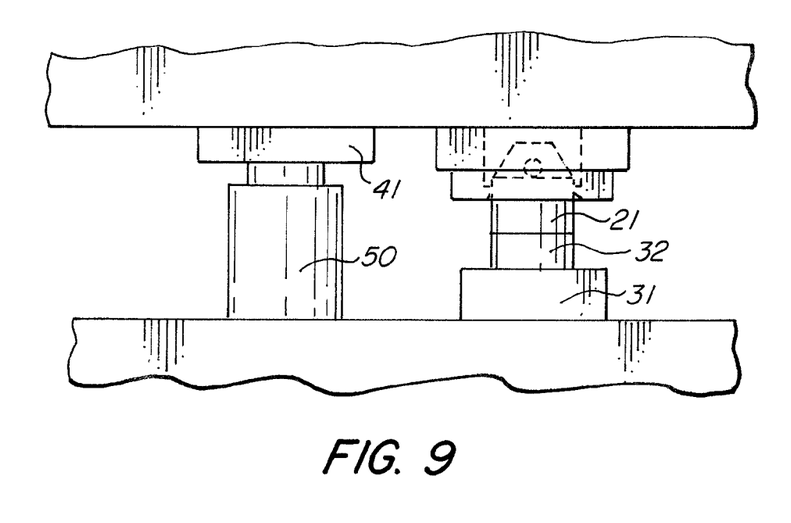
FIG. 9 is a side view of the alignment mechanism in FIG. 1 with the platform in position.
Figure 10:
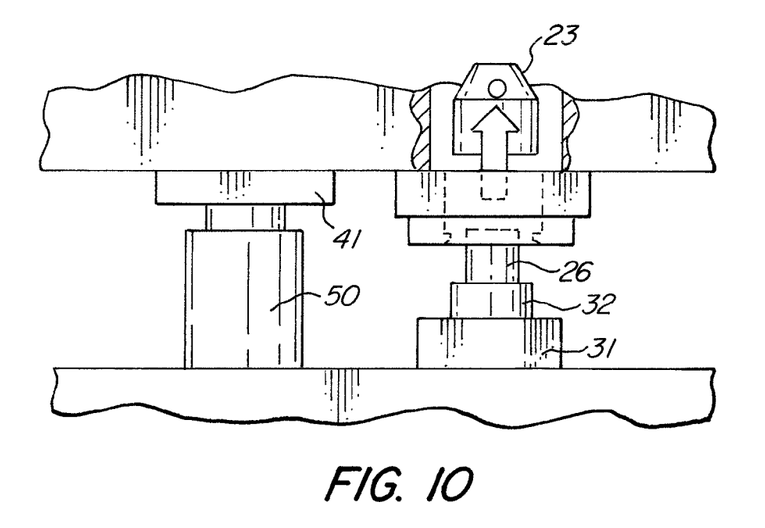
FIG. 10 is a side view of the alignment mechanism in FIG. 1 with the platform in position and the centering projection being removed.

FIG. 9 shows the platform 40 firmly in place on top of the load cell 50 and the centering projection 21 still in place. FIG. 10 shows the centering projection 21 being removed, returning the scale 10 to service.

It should be noted that although the preferred embodiment has been shown with four alignment mechanisms 20, it is theoretically possible to achieve alignment with as few as two such mechanisms 20 positioned on a common diagonal. However, it is preferred to have at least one alignment mechanism 20 for each load cell 50. Furthermore, the removal of the centering projection 21 is only necessary when the clearance between it and the centering fixture 22 is tight for precision alignment. If a precise alignment of the platform 40 is not necessary and the clearance allows, the scale 10 could be operated with fixed centering projections 21.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A scale for weighing a vehicle comprising:
   a removable platform, said removable platform having a raised and a lowered position;
   a plurality of centering fixtures on said removable platform, each said centering fixture having a bottom section with a cavity having a perimeter;
   a plurality of load cells to support said removable platform in the lowered position;
   a plurality of centering projections separate from said plurality of load cells, said plurality of centering projections having an outer surface and a bottom portion with a cavity having a perimeter;
   a plurality of studs with an outer surface;
   the cavity of each of said plurality of centering projections fits over said studs, holding said plurality of centering projections in place;
   the perimeter of the cavity of said plurality of centering fixtures fits over the outer surface of said plurality of centering projections when said removable platform is in the lowered position; and
   said centering projections are removable from said studs when said removable platform is in the lowered position.

2. The scale according to claim 1, wherein at least one of said centering projections has a top section which is one of domed, conical, frusto conical, triangular, and rounded.

3. The scale according to claim 1, wherein at least one of said centering projections has a top section extending distally and having a converging perimeter in the distal direction.

4. The scale according to claim 1, wherein the cavity of said plurality of centering fixtures has an opening which is one of chamfered, flared, angled, and rounded.

5. The scale according to claim 1, wherein the outer surface of at least one said centering projections has a plurality of indentations.

6. The scale according to claim 1, wherein the outer surface of at least one of said plurality of centering projections has a bore extending through.

7. The scale according to claim 1, wherein said studs have a round cross section.

8. The scale according to claim 1, wherein said studs have a top section which is one of domed, conical, frusto conical, triangular, and rounded.

9. The scale according to claim 1, wherein the outer perimeter of the cavity in the bottom portion of the centering projection has an opening which is one of chamfered, flared, angled, and rounded.

10. The scale according to claim 1, wherein the outer perimeter of at least one of said plurality of centering projections is larger than the outer perimeter of the rest of said plurality of centering projections.

11. The scale according to claim 1, wherein each of said plurality of load cells has at least one said centering projection corresponding to it.

12. The scale according to claim 1, wherein the centering projections have a round cross-section.

13. The scale according to claim 1, wherein said plurality of centering fixtures are formed integrally with said removable platform.

14. The scale according to claim 1, wherein said plurality of centering fixtures are replaceable.

15. The scale according to claim 1, wherein a base plate is positioned on a surface and on top of said base plate is at least one of said plurality of load cells and at least one of said plurality of centering projections.

16. The scale according to claim 15, wherein at least 4 of said base plates are positioned on said surface.

17. The scale according to claim 1, wherein said removable platform has at least one access panel.

18. A scale for weighing a vehicle comprising of
   a removable platform, said removable platform having a raised and a lowered position;
   a plurality of load cells to support said removable platform in the lowered position;
   a plurality of centering projections separate from said plurality of load cells, said centering projections being removably attachable when said removable platform is in the lowered position;
   a plurality of centering fixtures on said removable platform; and said plurality of centering projections fit into said plurality of centering fixtures when said removable platform is in the lowered position.

19. A scale for weighing a vehicle comprising:
a removable platform, said removable platform having a raised and a lowered position;
a plurality of centering fixtures on said removable platform;
a plurality of load cells to support said removable platform;
a plurality of centering projections separate from said plurality of load cells, said plurality of centering projections having an outer surface;
said plurality of centering fixtures fit at least partially over said plurality of centering projections when said removable platform is in the lowered position; and
said centering projections are removably attachable when said removable platform is in the lowered position.

20. The scale according to claim 19, wherein at least one of said centering projections has a top section extending distally and having a converging perimeter in the distal direction.

21. The scale according to claim 19, wherein the cavity of said plurality of centering fixtures has an opening which is one of chamfered, flared, angled, and rounded.

22. The scale according to claim 19, wherein the outer perimeter of at least one of said plurality of centering projections is larger than the outer perimeter of the rest of said plurality of centering projections.

23. A method of configuring a truck scale, said method comprising the steps of:
lowering a scale platform from a raised position onto a plurality of load cells to reach a lowered position, said platform having centering fixtures that engage a plurality of centering projections in order to position said platform onto said plurality of load cells while lowering; and
removing said centering projections when said platform is in the lowered position on said plurality of load cells.

24. The method of claim 23, wherein at least one of said centering projections has a top section extending distally and having a converging perimeter in the distal direction.

25. The method of claim 24, wherein the step of removing said centering projections further comprises removing said centering projections from a corresponding plurality of centering studs.

* * * * *